US008634846B2

(12) United States Patent
Garrett et al.

(10) Patent No.: US 8,634,846 B2
(45) Date of Patent: Jan. 21, 2014

(54) METHOD AND SYSTEM FOR DETERMINING A LOCATION OF A MOBILE DEVICE BASED ON A PLURALITY OF LOCATION SAMPLES

(75) Inventors: David Garrett, Tustin, CA (US); Charles Abraham, Los Gatos, CA (US); Mark Buer, Gilbert, AZ (US); Jeyhan Karaoguz, Irvine, CA (US); David Lundgren, Mill Valley, CA (US); Dave Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 232 days.

(21) Appl. No.: 12/728,957

(22) Filed: Mar. 22, 2010

(65) Prior Publication Data

US 2011/0212732 A1    Sep. 1, 2011

Related U.S. Application Data

(60) Provisional application No. 61/309,071, filed on Mar. 1, 2010.

(51) Int. Cl.
*H04W 24/00* (2009.01)
(52) U.S. Cl.
USPC ..................................................... 455/456.1
(58) Field of Classification Search
USPC .......... 455/456.1–457; 340/988–994, 995.28, 340/8.1; 701/207, 208, 209, 213, 214, 216
See application file for complete search history.

(56) References Cited

U.S. PATENT DOCUMENTS

| | | | | |
|---|---|---|---|---|
| 6,459,903 | B1 * | 10/2002 | Lee | 455/456.1 |
| 7,139,252 | B2 * | 11/2006 | Babu et al. | 370/312 |
| 2003/0225893 | A1 | 12/2003 | Roese et al. | |
| 2004/0203904 | A1 * | 10/2004 | Gwon et al. | 455/456.1 |
| 2005/0143100 | A1 * | 6/2005 | Shi et al. | 455/456.6 |
| 2006/0281470 | A1 * | 12/2006 | Shi et al. | 455/456.2 |
| 2007/0121560 | A1 * | 5/2007 | Edge | 370/338 |
| 2007/0202887 | A1 * | 8/2007 | Counts et al. | 455/456.1 |
| 2009/0005064 | A1 * | 1/2009 | Malik et al. | 455/456.1 |
| 2009/0312036 | A1 * | 12/2009 | Alizadeh-Shabdiz | 455/456.1 |

OTHER PUBLICATIONS

Location Aggregation from Multiple Sources, by Myllymaki et al., published Jan. 8-11, 2002.*

* cited by examiner

*Primary Examiner* — Lester Kincaid
*Assistant Examiner* — Daniel Lai
(74) *Attorney, Agent, or Firm* — Sterne, Kessler, Goldstein & Fox P.L.L.C.

(57) ABSTRACT

A mobile device may be operable to receive three or more location samples for the mobile device from each of three or more resources. Two or more valid location samples may be selected based on an accuracy indicator associated with each of the received location samples. A location of the mobile device may be determined utilizing the selected two or more valid location samples. A region around each of the received location samples may be determined based on the accuracy indicator and a condition of a geographic environment that is associated with each of the received location samples. Two or more valid location samples among the received location samples may be selected in instances when at least a portion of the region of each of the selected valid location samples overlaps with at least a portion of the regions of each of other selected valid location samples.

18 Claims, 7 Drawing Sheets

METHOD AND SYSTEM FOR DETERMINING A LOCATION OF A MOBILE DEVICE BASED ON A PLURALITY OF LOCATION SAMPLES

CROSS-REFERENCE TO RELATED APPLICATIONS/INCORPORATION BY REFERENCE

This patent application makes reference to, claims priority to, and claims benefit from U.S. Provisional Application Ser. No. 61/309,071, which was filed on Mar. 1, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for determining a location of a mobile device based on a plurality of location samples.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining a location of a mobile device based on a plurality of location samples, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining a location of a mobile device based on a plurality of location samples. In various embodiments of the invention, a mobile device may be operable to receive three or more location samples for the mobile device from each of three or more corresponding resources. Two or more valid location samples may be selected from among the received three or more location samples based on an accuracy indicator that is associated with each of the received location samples. A location of the mobile device may be determined utilizing the selected two or more valid location samples. In this regard, a region around each of the received location samples may be determined based on the accuracy indicator and a condition of a geographic environment that is associated with each of the received location samples. Two or more valid location samples among the received location samples may be selected in instances when at least a portion of the region of each of the selected valid location samples overlaps with at least a portion of the regions of each of other selected valid location samples and the region of each unselected location samples does not have a portion that overlaps with a portion of the region of other received location samples. The location of the mobile device may then be determined utilizing the selected two or more valid location samples.

In instances when the region of each of the received location samples does not have a portion that overlaps with a portion of the regions of other received location samples, the region of each of the received location samples may be expanded proportionally until a portion of the expanded regions of two or more of the received location samples overlap before reaching a particular boundary that is associated with each of the received location samples or until the particular boundary is reached. In this regard, two or more valid location samples among the received location samples may be selected in instances when at least a portion of the expanded region of each of the selected valid location samples overlaps with at least a portion of the expanded regions of each of the other selected valid location samples and the expanded region of each unselected location samples does not have a portion that overlaps with a portion of the expanded regions of other received location samples. The location of the mobile device, which may include an uncertainty, may then be determined utilizing the selected two or more valid location samples. In instances when the expanded region of each of the received location samples does not have a portion that overlaps with a portion of the expanded regions of other received location samples, each of the received location samples may be eliminated during the determination of the location of the mobile device.

In instances when multiple portions of the regions of the received location samples may overlap, the region of each of the received location samples may be expanded proportionally until a portion of the expanded regions for a majority of the received location samples overlap before reaching a particular boundary, which is associated with each of the received location samples, or until the particular boundary is reached. In this regard, the valid location samples may be selected from among the received location samples by choosing the majority of the received location samples where a portion of the expanded regions overlap. The location of the mobile device, which may include an uncertainty, may then be determined utilizing the selected valid location samples. In this case, in instances when the overlap of a portion of the expanded regions of the majority of the received location samples does not occur, each of the received location samples may be eliminated during the determination of the location of the mobile device.

In an exemplary embodiment of the invention, the mobile device may be operable to communicate the received three or more location samples to a location server. The location server may then perform the selection from among the received three or more location samples and selects the two or more valid location samples based on the associated accuracy indicator. The selected two or more valid location samples may then be communicated to the mobile device by the location server for determining the location of the mobile device.

The mobile device may be operable to acquire one or more of the location samples for the mobile device utilizing, for example, a global navigation satellite system (GNSS). One or more of the location samples may be acquired by the mobile device utilizing, for example, one or more cell stations. One or more of the location samples may also be acquired by the mobile device utilizing, for example, a wireless access point (AP) with a known location.

Figure 1:
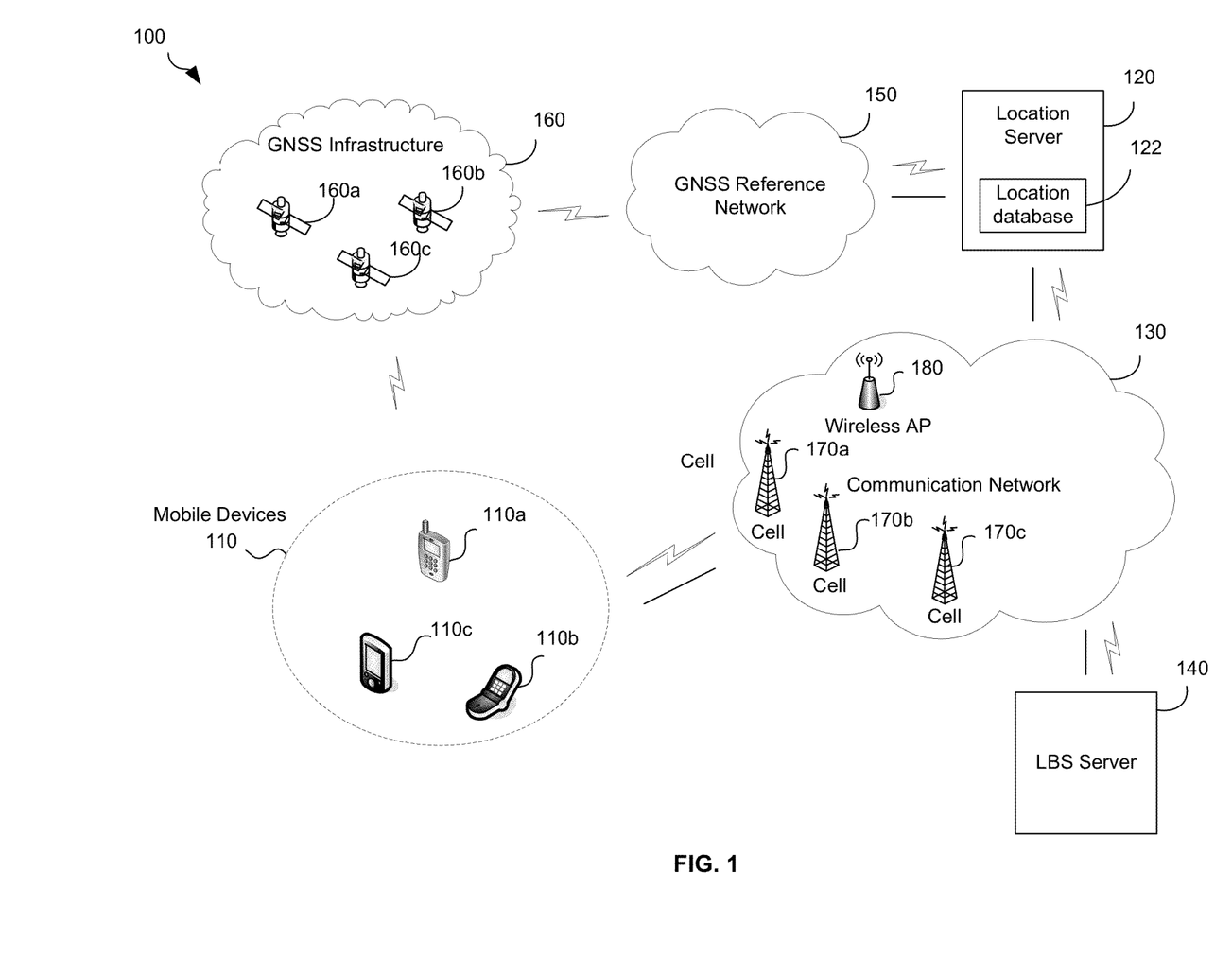
FIG. 1 is a block diagram illustrating an exemplary communication system that is operable to determine a location of a mobile device based on a plurality of location samples, in accordance with an embodiment of the invention.

FIG. 1 is a block diagram illustrating an exemplary communication system that is operable to determine a location of a mobile device based on a plurality of location samples, in accordance with an embodiment of the invention. Referring to FIG. 1, there is shown a communication system 100. The communication system 100 comprises a plurality of mobile devices 110, of which mobile 110a-110c are illustrated, a location server 120 comprising a location database 122, a communication network 130, a LBS server 140, a GNSS reference network 150 and a GNSS infrastructure 160. The communication network 130 may comprise a wireless AP 180 and one or more cell stations such as cell stations 170a-170c. The GNSS infrastructure 160 may comprise a plurality of GNSS satellites, of which GNSS satellites 160a-160c are illustrated.

Each of the mobile devices 110a-110c such as the mobile device 110a may comprise suitable logic, circuitry, interfaces and/or code that may be operable to communicate radio signals across the communication network 130, for example, via the cell stations 170a-170c and/or the wireless AP 180. The mobile device 110a may be operable to, for example, receive GNSS broadcast signals from a plurality of visible GNSS satellites such as GNSS satellites 160a-160c in the GNSS infrastructure 160. In an exemplary embodiment of the invention, the mobile device 110a may be operable to receive three or more location samples for the mobile device 110a from each of three or more resources using various location techniques. In this regard, the mobile device 110a may be operable to acquire one or more of the location samples for the mobile device 110a utilizing, for example, a global navigation satellite system (GNSS). For example, a location sample for the mobile device 110a may be acquired using GNSS signals received from the GNSS satellites 160a-160c. One or more of the location samples may be acquired by the mobile device 110a utilizing, for example, one or more cell stations. For example, a location sample for the mobile device 110a may be acquired by triangulating cellular signals received from cell stations 170a-170c. One or more of the location samples may also be acquired by the mobile device 110a utilizing, for example, a wireless access point (AP) such as the wireless AP 180 with a known location. For example, a location sample for the mobile device 110a may be acquired by communicating with the wireless AP 180, whenever the mobile device 110a is within proximity of the wireless AP 180.

Two or more valid location samples may be selected from among the received three or more location samples based on an accuracy indicator that is associated with each of the received location samples. A location of the mobile device 110a may be determined utilizing the selected two or more valid location samples. In this regard, a region around each of the received location samples may be determined based on the accuracy indicator and a condition of a geographic environment that is associated with each of the received location samples. For example, the accuracy indicator for a location sample received utilizing the GNSS satellites 160a-160c may be an accuracy of 10 meters. The accuracy indicator for a location sample received utilizing triangulation of cell stations 170a-170c may be, for example, an accuracy of 50 meters. The accuracy indicator for a location sample received utilizing the wireless AP 180 may be, for example, an accuracy of 20 meters. The condition of the geographic environment may comprise, for example, a building blockage environment and/or a direction of the resource in relation to the mobile device 110a. Accordingly, two or more valid location samples among the received location samples may be selected in instances when at least a portion of the region of each of the selected valid location samples overlaps with at least a portion of the regions of each of other selected valid location samples and the region of each unselected location samples does not have a portion that overlaps with a portion of the region of other received location samples. The location of the mobile device 110a may then be determined utilizing the selected two or more valid location samples. For example, the location of the mobile device 110a may be calculated by averaging the selected two or more valid location samples.

In instances when the region of each of the received location samples does not have a portion that overlaps with a portion of the regions of other location samples, the region of each of the received location samples may be expanded proportionally until a portion of the expanded regions of two or more of the received location samples overlap before reaching a particular boundary that is associated with each of the received location samples or until the particular boundary is reached. In this regard, two or more valid location samples among the received location samples may be selected in instances when at least a portion of the expanded region of each of the selected valid location samples overlaps with at least a portion of the expanded regions of each of other selected valid location samples and the expanded region of each unselected location samples does not have a portion that overlaps with a portion of the expanded regions of other received location samples. In this instance, the location of the mobile device 110a may still be determined utilizing the selected two or more valid location samples but with an uncertainty. For example, the location of the mobile device 110a may be determined with an indication of 100 meters uncertainty. In instances when the expanded region of each of the received location samples does not have a portion that overlaps with a portion of the expanded regions of other location samples, each of the received location samples may be eliminated during the determination of the location of the mobile device 110a.

In instances when multiple portions of the regions of the received location samples may overlap, the region of each of the received location samples may be expanded proportionally until a portion of the expanded regions for a majority of the received location samples overlap before reaching a particular boundary, which is associated with each of the received location samples, or until the particular boundary is reached. In this regard, the valid location samples may be selected from among the received location samples by choosing the majority of the received location samples where a portion of the expanded regions overlap. The location of the mobile device 110a, which may include an uncertainty, may then be determined utilizing the selected valid location samples. In this case, in instances when the overlap of a portion of the expanded regions of the majority of the received location samples does not occur, each of the received location samples may be eliminated during the determination of the location of the mobile device 110a.

In an exemplary embodiment of the invention, the mobile device 110a may be operable to communicate the received three or more location samples to a location server 120. The location server 120 may then perform the selection from among the received three or more location samples and selects the two or more valid location samples based on the associated accuracy indicator. The selected two or more valid location samples may then be communicated to the mobile device 110a by the location server 120 for determining the location of the mobile device 110a.

The location server 120 may comprise suitable logic, circuitry, interfaces and/or code that may be operable to access the GNSS reference network 150 to collect GNSS satellite data by tracking GNSS constellations through the GNSS reference network 150. The location server 120 may be operable to utilize the collected GNSS satellite data to generate GNSS assistance data (A-GNSS data) comprising, for example, ephemeris data, long term orbit (LTO) data, reference positions and/or time information. The location server 120 may be operable to collect and/or retrieve location information or data from associated users such as the cell stations 170a-170c, the wireless AP 180 and/or the mobile devices 110. The received location data may be stored in the location database 122 so that it may be shared among associated mobile devices such as the mobile device 110a. The location server 120 may be operable to communicate the stored location data as A-GNSS data to the mobile device 110a, when need.

In an exemplary embodiment of the invention, the location server 120 may be operable to receive the location samples for the mobile device 110a from the mobile device 110a. The location server 120 may then perform the selection from among the received location samples and selects the two or more valid location samples based on the associated accuracy indicator. The selected two or more valid location samples may then be communicated to the mobile device 110a by the location server 120 for determining the location of the mobile device 110a.

The communication network 130 may comprise suitable logic, circuitry, interfaces and/or code that may be operable to provide voice and data services to various mobile devices such as the mobile devices 110a-110c by using wireless and/or wired communication technologies such as, for example, WCDMA, UMTS, HSDPA, CDMA, EV-DO, GSM, GPRS, EDGE, EGPRS, LTE, Bluetooth, WiMAX, WiFi, FM, mobile TV and Ethernet. The communication network 130 may be operable to provide communication among the location server 120, the LBS server 140 and a plurality of served mobile devices such as the mobile devices 110a-110c. The communication network 130 may comprise a plurality of RF nodes or RF network devices such as, for example, the cell stations 170a-170c and/or the wireless AP 180.

The LBS server 140 may comprise suitable logic, circuitry, interfaces and/or code that may be operable to provide location based services (LBS). The LBS server may be operable to retrieve information such as, for example, local hotel addresses or a map of the vicinity of areas of interest. The LBS server 140 may be operable to communicate the retrieved information with various communication devices such as the mobile device 110a based on an associated position or location.

The GNSS reference network 150 may comprise suitable logic, circuitry, interfaces and/or code that may be operable to collect and/or distribute data for GNSS satellites 160a-160c on a continuous basis. The GNSS reference network 150 may comprise a plurality of GNSS reference tracking stations or receivers located around the world to provide A-GNSS coverage all the time in both a home network and/or any visited network. The GNSS reference network 150 may be communicatively coupled to the location server 120. The collected GNSS data or information may be utilized by the location server 120 to enhance LBS performance.

Each of the GNSS satellites 160a-160c such as the satellite 160a may comprise suitable logic, circuitry, interfaces and/or code that may be operable to generate and broadcast satellite navigational information. The broadcast satellite navigation information may be collected by the mobile devices 110a-110c, for example. The broadcast satellite navigational information may be collected by the GNSS reference network 150 to be utilized by the location server 120 to enhance LBS performance. The GNSS satellites 160a-160c may comprise, for example, GPS, GLONASS, Galileo and/or Compass satellites.

In operation, the mobile device 110a may be operable to receive three or more location samples for the mobile device 110a from each of three or more resources using various location techniques. In this regard, the mobile device 110a may be operable to acquire one or more of the location samples for the mobile device 110a utilizing, for example, a GNSS. For example, a location sample for the mobile device 110a may be acquired using GNSS signals received from the GNSS satellites 160a-160c. One or more of the location samples may be acquired by the mobile device 110a utilizing, for example, one or more cell stations. For example, a location sample for the mobile device 110a may be acquired by triangulating cellular signals received from cell stations 170a-170c. One or more of the location samples may also be acquired by the mobile device 110a utilizing, for example, a wireless AP such as the wireless AP 180 with a known location. For example, a location sample for the mobile device 110a may be acquired by communicating with the wireless AP 180, whenever the mobile device 110a is within proximity of the wireless AP 180.

Two or more valid location samples may be selected from among the received three or more location samples based on an accuracy indicator that is associated with each of the received location samples. A location of the mobile device 110a may be determined utilizing the selected two or more valid location samples. In this regard, a region around each of the received location samples may be determined based on the accuracy indicator and a condition of a geographic environment that is associated with each of the received location samples. For example, the accuracy indicator for a location sample received utilizing the GNSS satellites 160a-160c may be an accuracy of 10 meters. The accuracy indicator for a location sample received utilizing triangulation of cell stations 170a-170c may be, for example, an accuracy of 50 meters. The accuracy indicator for a location sample received utilizing the wireless AP 180 may be, for example, an accuracy of 20 meters. The condition of the geographic environment may comprise, for example, a building blockage environment and/or a direction of the resource in relation to the mobile device 110a. Accordingly, two or more valid location samples among the received location samples may be selected in instances when at least a portion of the region of each of the selected valid location samples overlaps with at least a portion of the regions of each of other selected valid location samples and the region of each of the unselected location samples does not have a portion that overlaps with a portion of the region of other received location samples. The location of the mobile device 110a may then be determined utilizing the selected two or more valid location samples. For example, the location of the mobile device 110a may be calculated by averaging the selected two or more valid location samples.

In instances when the region of each of the received location samples does not have a portion that overlaps with a portion of the regions of other location samples, the region of each of the received location samples may be expanded proportionally until a portion of the expanded regions of two or more of the received location samples overlap before reaching a particular boundary that is associated with each of the received location samples or until the particular boundary is reached. In this regard, two or more valid location samples among the received location samples may be selected in instances when at least a portion of the expanded region of each of the selected valid location samples overlaps with at least a portion of the expanded regions of each of other selected valid location samples and the expanded region of each of the unselected location samples does not have a portion that overlaps with a portion of the expanded region of other received location samples. In this instance, the location of the mobile device 110a may still be determined utilizing the selected two or more valid location samples but with an uncertainty. For example, the location of the mobile device 110a may be determined with an indication of 100 meters uncertainty. In instances when the expanded region of each of the received location samples does not have a portion that overlaps with a portion of the expanded regions of other location samples, each of the received location samples may be eliminated during the determination of the location of the mobile device 110a.

In instances when multiple portions of the regions of the received location samples may overlap, the region of each of the received location samples may be expanded proportionally until a portion of the expanded regions for a majority of the received location samples overlap before reaching a particular boundary, which is associated with each of the received location samples, or until the particular boundary is reached. In this regard, the valid location samples may be selected from among the received location samples by choosing the majority of the received location samples where a portion of the expanded regions overlap. The location of the mobile device 110a, which may include an uncertainty, may then be determined utilizing the selected valid location samples. In this case, in instances when the overlap of a portion of the expanded regions of the majority of the received location samples does not occur, each of the received location samples may be eliminated during the determination of the location of the mobile device 110a.

In an exemplary embodiment of the invention, the mobile device 110a may be operable to communicate the received three or more location samples to a location server 120. The location server 120 may then perform the selection from among the received three or more location samples and selects the two or more valid location samples based on the associated accuracy indicator. The selected two or more valid location samples may then be communicated to the mobile device 110a by the location server 120 for determining the location of the mobile device 110a.

Figure 2A:
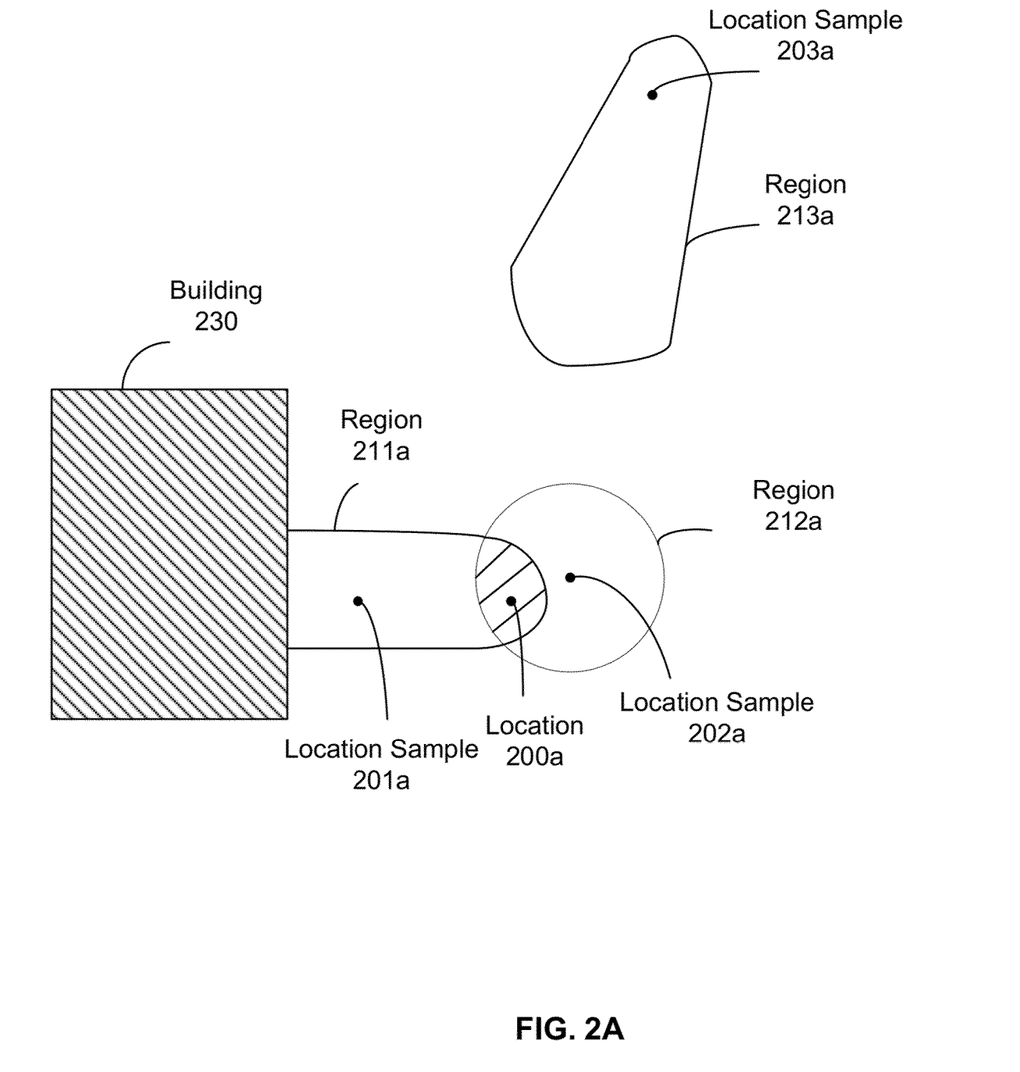
FIG. 2A is a block diagram illustrating exemplary location samples that are utilized to determine a location of a mobile device, in accordance with an embodiment of the invention.

FIG. 2A is a block diagram illustrating exemplary location samples that are utilized to determine a location of a mobile device, in accordance with an embodiment of the invention. Referring to FIG. 2A, there is shown a plurality of location samples of the mobile device 110a, of which location samples 201a, 202a, 203a are illustrated, a plurality of regions, of which regions 211a, 212a, 213a are illustrated and a building 230.

The location samples 201a, 202a, 203a may be received by the mobile device 110a from resources with various location techniques. For example, the location sample 202a may be acquired using GNSS signals received from the GNSS satellites 160a-160c. The location sample 203a may be acquired, for example, utilizing one or more cell stations 170a-170c. The location sample 201a may be acquired, for example, by communicating with the wireless AP 180 whenever the mobile device 110a is within proximity of the wireless AP 180. The region 212a associated with the location sample 202a may be determined based on, for example, a GNSS accuracy of 10 meters. In this regard, the mobile device 110a may be somewhere in the region 212a according to the location sample 202a. The region 213a associated with the location 203a may be determined based on, for example, a cell station accuracy of 50 meters and the directions of the cell stations 170a-170c in relation to the mobile device 110a. In this regard, the mobile device 110a may be somewhere in the region 213a according to the location 203a. The region 211a associated with the location sample 201a may be determined based on, for example, a wireless AP accuracy of 20 meters, the direction of the wireless AP 180 in relation to the mobile device 110a and a blockage due to, for example, the building 230. In this regard, the mobile device 110a may be somewhere in the region 211a according to the location sample 201a.

In an exemplary embodiment of the invention, a location of the mobile device 110a may be determined based on a result of selecting two or more valid location samples among the location samples 201a, 202a, 203a. As illustrated in FIG. 2A, a portion of the region 211a overlaps with a portion of the region 212a while the region 213a does not have a portion that overlaps with a portion of other regions. Accordingly, the location samples 201a and 202a may be selected and utilized to determine a location such as the location 200a of the mobile device 110a. In this regard, the location sample 203a that is not selected to determine the location 200a may be considered in error due to, for example, weak signals and/or interference.

In the exemplary embodiment of the invention illustrated in FIG. 2A, three location samples 201a, 202a, 203a are shown. Notwithstanding, the invention is not so limited and more than three location samples may be received by the mobile device 110a.

Figure 2B:
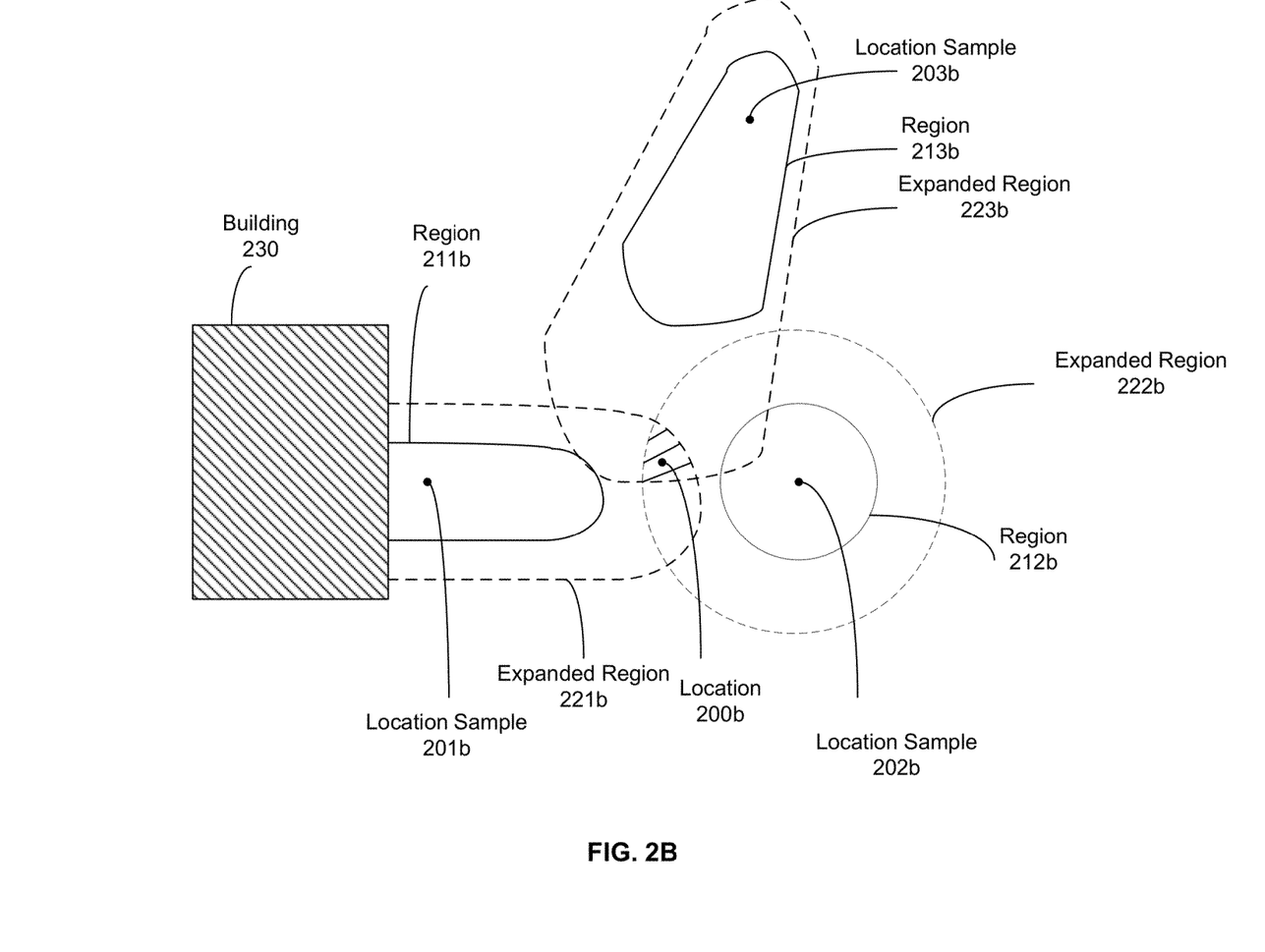
FIG. 2B is a block diagram illustrating exemplary location samples that are utilized to determine a location of a mobile device with an uncertainty, in accordance with an embodiment of the invention.

FIG. 2B is a block diagram illustrating exemplary location samples that are utilized to determine a location of a mobile device with an uncertainty, in accordance with an embodiment of the invention. Referring to FIG. 2B, there is shown a plurality of location samples of the mobile device 110a, of which location samples 201b, 202b, 203b are illustrated, a plurality of regions, of which regions 211b, 212b, 213b are illustrated, a plurality of expanded regions, of which expanded regions 221b, 222b, 223b are illustrated and a building 230.

The location samples 201b, 202b, 203b may be substantially the same as the location samples 201a, 202a, 203a described with respect to FIG. 2A. The regions 211b, 212b, 213b may be substantially the same as the regions 211a, 212a, 213a described with respect to FIG. 2A. The building 230 is described with respect to FIG. 2A. As illustrated in FIG. 2B, each of the regions 211b, 212b, 213b does not have a portion that overlaps with a portion of other regions. In this regard, for example, the regions 211b, 212b, 213b may be expanded proportionally to the expanded regions 221b, 222b, 223b, respectively based on a particular or specified boundary associated with each of the location samples 201b, 202b, 203b or until two or more of the expanded regions 221b, 222b, 223b overlap before reaching the corresponding boundaries. For example, the region 211b may be expanded to the expanded region 221b with a 5-meter distance. The region 212b may be expanded to the expanded region 222b with a 2-meter distance. The region 213b may be expanded to the expanded region 223b with a 20-meter distance. A region such as the region 212b that is determined based on the GNSS satellites 160a-160c may expand slower than a region such as the region 213b that is determined based on the cell stations 170a-170c, for example.

In an exemplary embodiment of the invention, a location of the mobile device 110a may be determined based on a result of selecting two or more valid location samples among the location samples 201b 202b, 203b. As illustrated in FIG. 2B, a portion of each of the expanded regions 221b, 222b, 223b overlaps with a portion of other expanded regions, for example, although each of the regions 211b, 212b, 213b does not have a portion that overlaps with a portion of other regions. Accordingly, the location samples 201b, 202b, 203b may still be selected and utilized to determine a location such as the location 200b of the mobile device 110a with an indication of uncertainty. For example, the location 200b may be determined with an indication of 60 meters uncertainty.

In the exemplary embodiment of the invention illustrated in FIG. 2B, three location samples 201b, 202b, 203b are shown. Notwithstanding, the invention is not so limited and more than three location samples may be received by the mobile device 110a. For example, five regions associated with five location samples may be illustrated. In this case, in instances when two sets of two regions overlap, the regions may be expanded as described with respect to FIG. 2B until a majority of the five expanded regions such as three expanded regions overlap before reaching the corresponding boundaries or until the corresponding boundaries are reached.

Figure 2C:
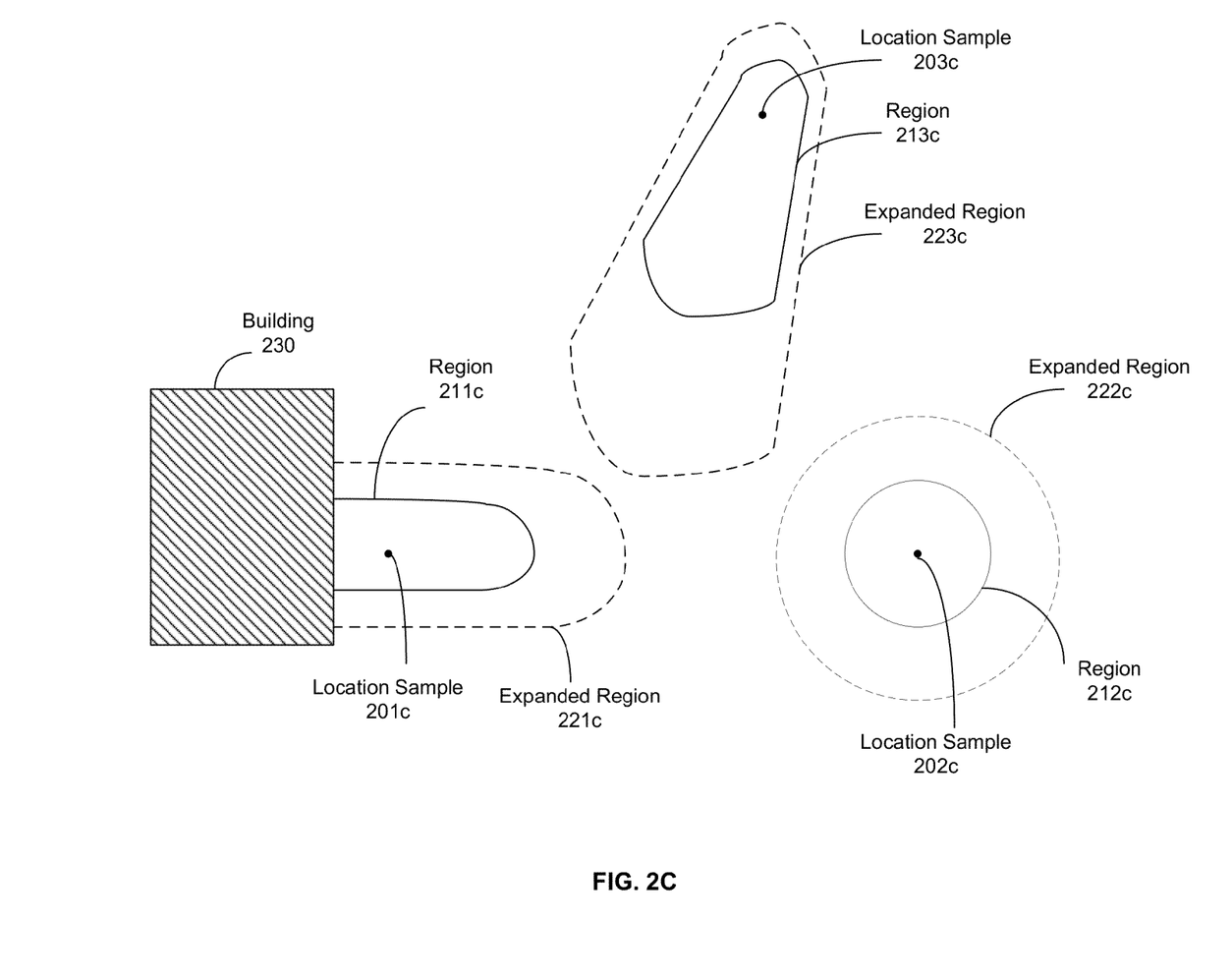
FIG. 2C is a block diagram illustrating exemplary location samples that may be eliminated during an exemplary determination of a location of a mobile device, in accordance with an embodiment of the invention.

FIG. 2C is a block diagram illustrating exemplary location samples that may be eliminated during an exemplary determination of a location of a mobile device, in accordance with an embodiment of the invention. Referring to FIG. 2C, there is shown a plurality of location samples of the mobile device 110a, of which location samples 201c, 202c, 203c are illustrated, a plurality of regions, of which regions 211c, 212c, 213c are illustrated, a plurality of expanded regions, of which expanded regions 221c, 222c, 223c are illustrated and a building 230.

The location samples 201c, 202c, 203c may be substantially the same as the location samples 201a, 202a, 203a described with respect to FIG. 2A. The regions 211c, 212c, 213c may be substantially the same as the regions 211a, 212a, 213a described with respect to FIG. 2A. The expanded regions 221c, 222c, 223c may be substantially the same as the expanded regions 221b, 222b, 223b described with respect to FIG. 2B. The building 230 is described with respect to FIG. 2A. As illustrated in FIG. 2C, each of the regions 211c, 212c, 213c does not have a portion that overlaps with a portion of other regions. Each of the expanded regions 221c, 222c, 223c does not have a portion that overlaps with a portion of other expanded regions.

In an exemplary embodiment of the invention, a location of the mobile device 110a may be determined based on a result of selecting two or more valid location samples among the location samples 201b 202b, 203b. As illustrated in FIG. 2C, each of the expanded regions 221c, 222c, 223c does not have a portion that overlaps with a portion of other expanded regions. In this case, the expanded regions 221c, 222c, 223c had expanded to maximum region that is specified by the location service type, and the measurements may be unreliable to be used for determining an accurate location for the mobile device 110a. Accordingly, the location samples 201c, 202c, 203c may be eliminated during the determination of a location of the mobile device 110a.

In the exemplary embodiment of the invention illustrated in FIG. 2C, three location samples 201c, 202c, 203c are shown. Notwithstanding, the invention is not so limited and more than three location samples may be received by the mobile device 110a.

Figure 3:
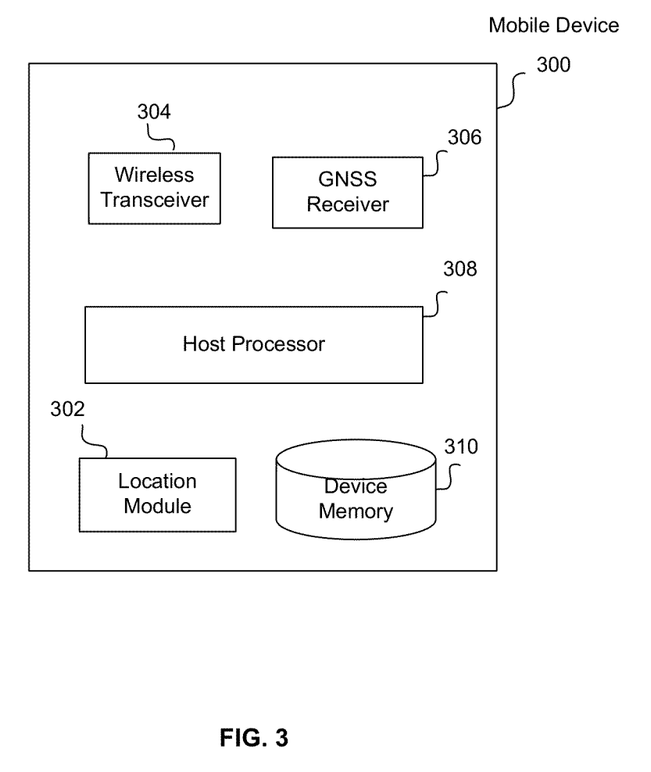
FIG. 3 is a block diagram illustrating an exemplary mobile device that is operable to determine a location of a mobile device based on a plurality of location samples, in accordance with an embodiment of the invention.

FIG. 3 is a block diagram illustrating an exemplary mobile device that is operable to determine a location of a mobile device based on a plurality of location samples, in accordance with an embodiment of the invention. Referring to FIG. 3, there is shown a mobile device 300. The mobile device 300 may comprise a location module 302, a wireless transceiver 304, a GNSS receiver 306, a host processor 308 and a device memory 310.

The location module 302 may comprise suitable logic, circuitry, interfaces and/or code that may be operable to determine a location of the mobile device 300. In an exemplary embodiment of the invention, the location module 302 may be operable to receive three or more location samples from each of three or more resources using various location techniques. In this regard, the location module 302 may be operable to receive one or more of the location samples from, for example, the GNSS receiver 306. One or more of the location samples may be received by the location module 302 from, for example, one or more cell stations such as the cell stations 170a-170c, via the wireless transceiver 304. One or more of the location samples may also be received by the location module 302 from, for example, a wireless AP such as the wireless AP 180 with a known location, via the wireless transceiver 304.

Two or more valid location samples may be selected by the location module 302 from among the received three or more location samples based on an accuracy indicator that is associated with each of the received location samples. A location of the mobile device 300 may be determined by the location module 302 utilizing the selected two or more valid location samples. In this regard, a region around each of the received location samples may be determined based on the accuracy indicator and a condition of a geographic environment that is associated with each of the received location samples. For example, the accuracy indicator for a location sample received utilizing the GNSS satellites 160*a*-160*c* may be an accuracy of 10 meters. The accuracy indicator for a location sample received utilizing one or more cell stations 170*a*-170*c* may be, for example, an accuracy of 50 meters. The accuracy indicator for a location sample received utilizing the wireless AP 180 may be, for example, an accuracy of 20 meters. The condition of the geographic environment may comprise, for example, a building blockage environment and/or a direction of the resource in relation to the mobile device 300. Accordingly, two or more valid location samples among the received location samples may be selected by the location module 302 in instances when at least a portion of the region of each of the selected valid location samples overlaps with at least a portion of the regions of each of other selected valid location samples and the region of each of the unselected location samples does not have a portion that overlaps with a portion of the region of other received location samples. The location of the mobile device 300 may then be determined by the location module 302 utilizing the selected two or more valid location samples. For example, the location samples 201*a* and 202*a* may be selected and utilized by the location module 302 to determine the location 200*a* of the mobile device 300.

In instances when the region of each of the received location samples does not have a portion that overlaps with a portion of the regions of other location samples, the region of each of the received location samples may be expanded proportionally until a portion of the expanded regions of two or more of the received location samples overlaps before reaching a particular boundary that is associated with each of the received location samples or until the particular boundary is reached. In this regard, two or more valid location samples among the received location samples may be selected by the location module 302 in instances when at least a portion of the expanded region of each of the selected valid location samples overlaps with at least a portion of the expanded regions of each of other selected valid location samples and the expanded region of each of the unselected location samples does not have a portion that overlaps with a portion of the expanded regions of other received location samples. In this instance, the location of the mobile device 300 may still be determined by the location module 302 utilizing the selected two or more valid location samples but with an uncertainty. For example, the location samples 201*b*, 202*b* and 203*b* may be selected and utilized by the location module 302 to determine the location 200*b* of the mobile device 300 with an indication of 60 meters uncertainty. In instances when the expanded region of each of the received location samples does not have a portion that overlaps with a portion of the expanded regions of other received location samples, each of the received location samples may be eliminated by the location module 302 during the determination of the location of the mobile device 300. For example, the location samples 201*c*, 202*c* and 203*c* may be eliminated by the location module 302 during the determination of a location of the mobile device 300.

In instances when multiple portions of the regions of the received location samples may overlap, the region of each of the received location samples may be expanded proportionally until a portion of the expanded regions for a majority of the received location samples overlap before reaching a particular boundary, which is associated with each of the received location samples, or until the particular boundary is reached. In this regard, the valid location samples may be selected by the location module 302 from among the received location samples by choosing the majority of the received location samples where a portion of the expanded regions overlap. The location of the mobile device 300, which may include an uncertainty, may then be determined by the location module 302 utilizing the selected valid location samples. In this case, in instances when the overlap of a portion of the expanded regions of the majority of the received location samples does not occur, each of the received location samples may be eliminated by the location module 302 during the determination of the location of the mobile device 300.

In an exemplary embodiment of the invention, the location module 302 may be operable to communicate the received three or more location samples to a location server 120. The location server 120 may then perform the selection from among the received three or more location samples and selects the two or more valid location samples based on the associated accuracy indicator. The selected two or more valid location samples may then be communicated to the location module 302 by the location server 120 for determining the location of the mobile device 300.

The GNSS receiver 306 may comprise suitable logic, circuitry, interfaces and/or code that may be operable to detect and receive GNSS signals from a plurality of visible GNSS satellites 160*a*-160*c*. The GNSS receiver 306 may be operable to utilize the received GNSS signals to calculate navigation information or solution such as a position fix and/or velocity of the GNSS receiver 306. The calculated navigation information may be provided to the host processor 308 to be communicated with the communication network 130 for various navigation applications such as, for example, location-based 411 and/or roadside assistance. In an exemplary embodiment of the invention, the calculated GNSS position fix or GNSS location sample may be provided to the location module 302. The GNSS location sample along with other location samples may be utilized by the location module 302 to determine a location of the mobile device 300 based on the associated accuracy indicator.

The wireless transceiver 304 may comprise suitable logic, circuitry, interfaces and/or code that may be operable to communicate radio signals over the communication network 130 using various wireless access technologies. For example, the wireless transceiver 304 may be operable to communicate with the cell stations 170*a*-170*c* and/or the wireless AP 180.

The host processor 308 may comprise suitable logic, circuitry, interfaces and/or code that may be operable to process signals from the wireless transceiver 304, the location module 302 and/or the GNSS receiver 306. The host processor 308 may manage and/or control operations of the wireless transceiver 304, the location module 302 and/or the GNSS receiver 306. The host processor 308 may be operable to communicate signals with the communication network 130 via the wireless transceiver 304. The host processor 308 may also be operable to communicate navigation information with the communication network 130 for various location-based services such as E-911, location-based 411 and/or location-based messaging.

The device memory 310 may comprise suitable logic, circuitry, interfaces and/or code that may be operable to store information such as executable instructions, data and/or database that may be utilized by the host processor 308 and the location module 302. The device memory 310 may comprise RAM, ROM, low latency nonvolatile memory such as flash memory and/or other suitable electronic data storage.

In operation, the location module 302 may be operable to receive three or more location samples from each of three or more resources using various location techniques. In this regard, the location module 302 may be operable to receive one or more of the location samples from, for example, the GNSS receiver 306. One or more of the location samples may be received by the location module 302 from, for example, one or more cell stations such as the cell stations 170a-170c, via the wireless transceiver 304. One or more of the location samples may also be received by the location module 302 from, for example, a wireless AP such as the wireless AP 180 with a known location, via the wireless transceiver 304.

Two or more valid location samples may be selected by the location module 302 from among the received three or more location samples based on an accuracy indicator that is associated with each of the received location samples. A location of the mobile device 300 may be determined by the location module 302 utilizing the selected two or more valid location samples. In this regard, a region around each of the received location samples may be determined based on the accuracy indicator and a condition of a geographic environment that is associated with each of the received location samples. For example, the accuracy indicator for a location sample received utilizing the GNSS satellites 160a-160c may be an accuracy of 10 meters. The accuracy indicator for a location sample received utilizing one or more cell stations 170a-170c may be, for example, an accuracy of 50 meters. The accuracy indicator for a location sample received utilizing the wireless AP 180 may be, for example, an accuracy of 20 meters. The condition of the geographic environment may comprise, for example, a building blockage environment and/or a direction of the resource in relation to the mobile device 300. Accordingly, two or more valid location samples among the received location samples may be selected by the location module 302 in instances when at least a portion of the region of each of the selected valid location samples overlaps with at least a portion of the regions of each of other selected valid location samples and the region of each of the unselected location samples does not have a portion that overlaps with a portion of the region of other received location samples. The location of the mobile device 300 may then be determined by the location module 302 utilizing the selected two or more valid location samples. For example, the location samples 201a and 202a may be selected and utilized by the location module 302 to determine the location 200a of the mobile device 300.

In instances when the region of each of the received location samples does not have a portion that overlaps with a portion of the regions of other location samples, the region of each of the received location samples may be expanded proportionally until a portion of the expanded regions of two or more of the received location samples overlap before reaching a particular boundary that is associated with each of the received location samples or until the particular boundary is reached. In this regard, two or more valid location samples among the received location samples may be selected by the location module 302 in instances when at least a portion of the expanded region of each of the selected valid location samples overlaps with at least a portion of the expanded regions of each of other selected valid location samples and the expanded region of each of the unselected location samples does not have a portion that overlaps with a portion of the expanded regions of other received location samples. In this instance, the location of the mobile device 300 may still be determined by the location module 302 utilizing the selected two or more valid location samples but with an uncertainty. For example, the location samples 201b, 202b and 203b may be selected and utilized by the location module 302 to determine the location 200b of the mobile device 300 with an indication of 60 meters uncertainty. In instances when the expanded region of each of the received location samples does not have a portion that overlaps with a portion of the expanded regions of other received location samples, each of the received location samples may be eliminated by the location module 302 during the determination of the location of the mobile device 300. For example, the location samples 201c, 202c and 203c may be eliminated by the location module 302 during the determination of a location of the mobile device 300.

In instances when multiple portions of the regions of the received location samples may overlap, the region of each of the received location samples may be expanded proportionally until a portion of the expanded regions for a majority of the received location samples overlap before reaching a particular boundary, which is associated with each of the received location samples, or until the particular boundary is reached. In this regard, the valid location samples may be selected by the location module 302 from among the received location samples by choosing the majority of the received location samples where a portion of the expanded regions overlap. The location of the mobile device 300, which may include an uncertainty, may then be determined by the location module 302 utilizing the selected valid location samples. In this case, in instances when the overlap of a portion of the expanded regions of the majority of the received location samples does not occur, each of the received location samples may be eliminated by the location module 302 during the determination of the location of the mobile device 300.

In an exemplary embodiment of the invention, the location module 302 may be operable to communicate the received three or more location samples to a location server 120. The location server 120 may then perform the selection from among the received three or more location samples and selects the two or more valid location samples based on the associated accuracy indicator. The selected two or more valid location samples may then be communicated to the location module 302 by the location server 120 for determining the location of the mobile device 300.

Figure 4:
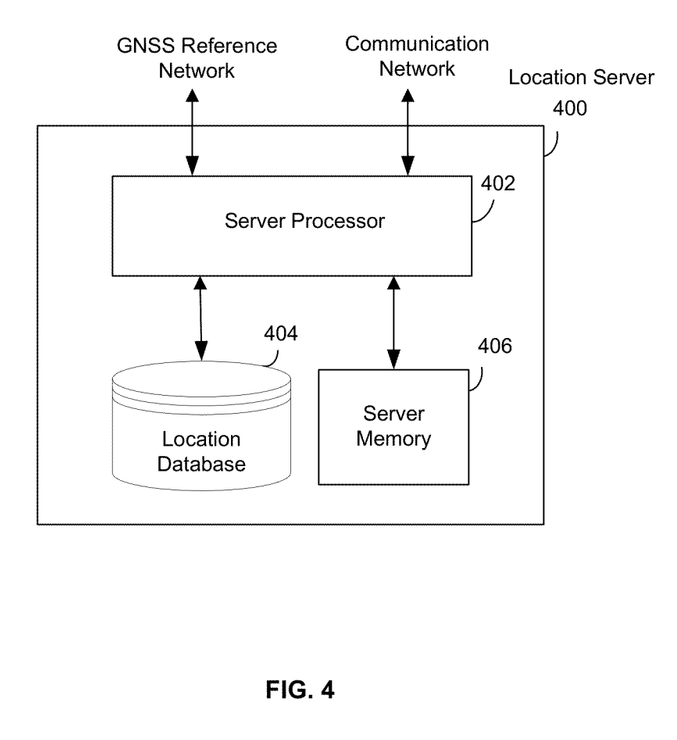
FIG. 4 is a block diagram illustrating an exemplary location server that is operable to determine a location of a mobile device based on a plurality of location samples, in accordance with an embodiment of the invention.

FIG. 4 is a block diagram illustrating an exemplary location server that is operable to determine a location of a mobile device based on a plurality of location samples, in accordance with an embodiment of the invention. Referring to FIG. 4, there is shown a location server 400. The location server 400 may comprise a server processor 402, a location database 404 and a server memory 406.

The server processor 402 may comprise suitable logic, circuitry, interfaces and/or code that may be operable to manage and/or control operations of the location database 404 and/or the server memory 406. The server processor 402 may be operable to communicate with the GNSS reference network 150 so as to collect GNSS satellite data by tracking GNSS constellations through the GNSS reference network 150. The server processor 402 may utilize the collected GNSS satellite data to build the location database 404, which may be coupled internally or externally to the location server 400. In an exemplary embodiment of the invention, the server processor 402 may be operable to receive the location samples for the mobile device 110a from the mobile device 110a. The server processor 402 may then perform the selection from among the received location samples and selects two or more valid location samples based on an accuracy indicator associated with each of the received location samples. The selected two or more valid location samples may then be communicated to the mobile device 110a by the server processor 402 for determining the location of the mobile device 110a.

The location database 404 may comprise suitable logic, circuitry, interfaces and/or code that may be operable to store location information of associated reference devices such as, for example, the cell stations 170a-170c and/or the wireless AP 180. The stored location information may be provided to associated communication devices such as the mobile device 110a to support LBS applications such as location-based access control.

The server memory 406 may comprise suitable logic, circuitry, interfaces and/or code that may be operable to store information such as executable instructions and data that may be utilized by the server processor 402 and/or other associated component units such as, for example, the location database 404. The server memory 306 may comprise RAM, ROM, low latency nonvolatile memory such as flash memory and/or other suitable electronic data storage.

In operation, the server processor 402 may be operable to receive the location samples for the mobile device 110a from the mobile device 110a. The server processor 402 may then perform the selection from among the received location samples and selects two or more valid location samples based on an accuracy indicator associated with each of the received location samples. The selected two or more valid location samples may then be communicated to the mobile device 110a by the server processor 402 for determining the location of the mobile device 110a.

Figure 5:
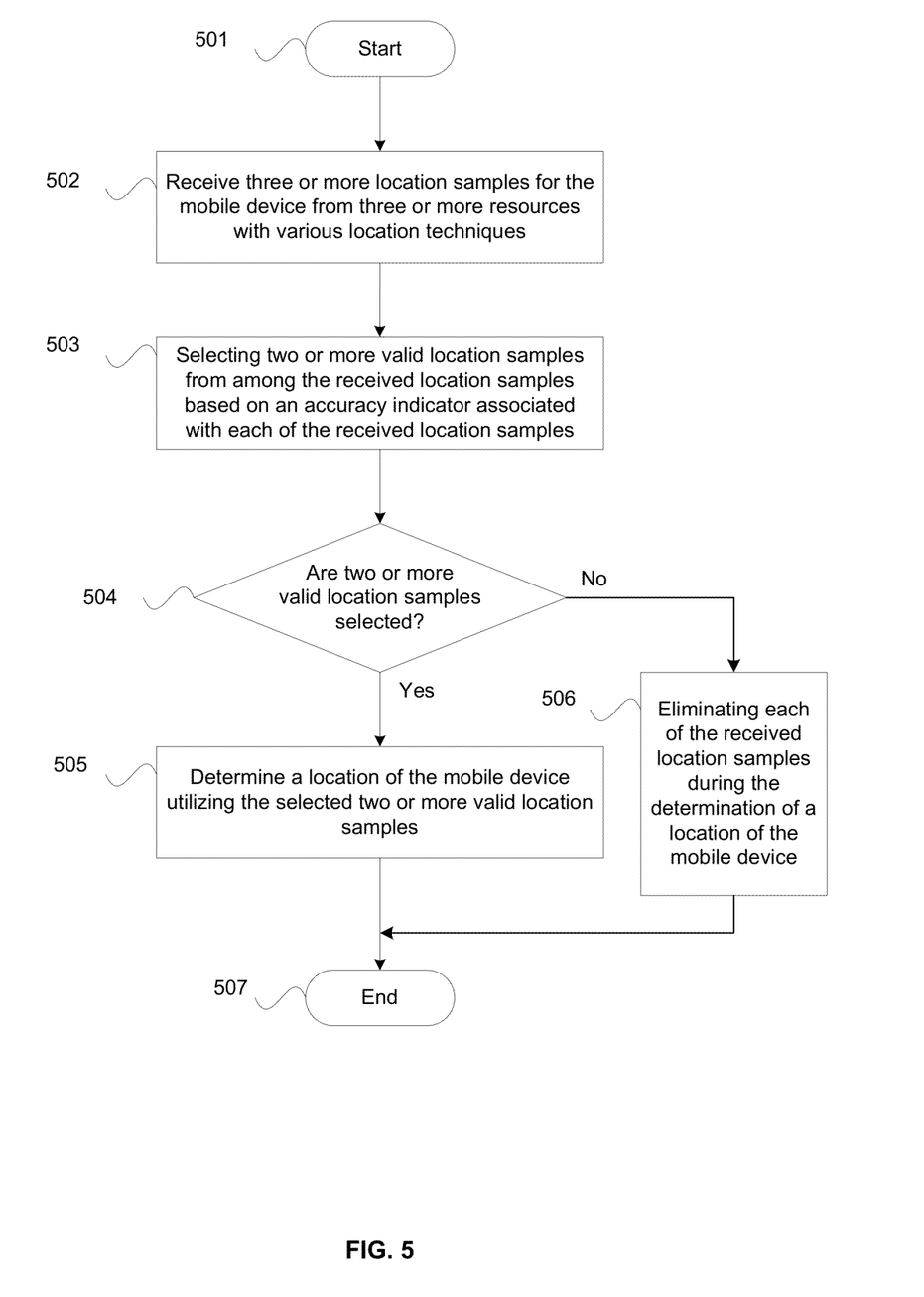
FIG. 5 is a flow chart illustrating exemplary steps for determining a location of a mobile device based on a plurality of location samples, in accordance with an embodiment of the invention.

FIG. 5 is a flow chart illustrating exemplary steps for determining a location of a mobile device based on a plurality of location samples, in accordance with an embodiment of the invention. Referring to FIG. 5, the exemplary steps start at step 501. In step 502, the location module 302 in the mobile device 300 may be operable to receive three or more location samples for the mobile device 300 from three or more resources with various location techniques. In step 503, two or more valid location samples among the received location samples may be selected based on an accuracy indicator associated with each of the received location samples. In step 504, it may be determined whether two or more valid location samples are selected. In instances when two or more valid location samples are selected, the exemplary steps may proceed to step 505. In step 505, the location module 302 in the mobile device 300 may be operable to determine a location of the mobile device 300 utilizing the selected two or more valid location samples. The exemplary steps may proceed to the end step 507. In step 504, in instances when two or more valid locations are not selected, the exemplary steps may proceed to step 506. In step 506, the location module 302 in the mobile device 300 may be operable to eliminate each of the received location samples during the determination of a location of the mobile device 300. The exemplary steps may proceed to the end step 507.

In various embodiments of the invention, a location module 302 in a mobile device 300 may be operable to receive three or more location samples for the mobile device 300 from each of three or more corresponding resources. Two or more valid location samples may be selected from among the received three or more location samples based on an accuracy indicator that is associated with each of the received location samples. A location of the mobile device 300 may be determined utilizing the selected two or more valid location samples. In this regard, a region around each of the received location samples may be determined based on the accuracy indicator and a condition of a geographic environment that is associated with each of the received location samples. Two or more valid location samples among the received location samples may be selected in instances when at least a portion of the region of each of the selected two or more valid location samples overlaps with at least a portion of the regions of one or more other valid location samples. The location of the mobile device 300 may then be determined utilizing the selected two or more valid location samples. For example, the location samples 201a and 202a may be selected and utilized by the location module 302 to determine the location 200a of the mobile device 300.

In instances when the region of each of the received location samples does not have a portion that overlaps with a portion of the regions of other received location samples, the region of each of the received location samples may be expanded to a particular boundary that is associated with each of the received location samples. In this regard, two or more valid location samples among the received location samples may be selected in instances when at least a portion of the expanded region of each of the selected two or more valid location samples overlaps with at least a portion of the expanded regions of one or more other valid location samples. The location of the mobile device 300 which may include an uncertainty may then be determined utilizing the selected two or more valid location samples. For example, the location samples 201b, 202b and 203b may be selected and utilized by the location module 302 to determine the location 200b of the mobile device 300 with an indication of uncertainty. In instances when the expanded region of each of the received location samples does not have a portion that overlaps with a portion of the expanded regions of other received location samples, each of the received location samples may be eliminated during the determination of a location of the mobile device 300. For example, the location samples 201c, 202c and 203c may be eliminated by the location module 302 during the determination of a location of the mobile device 300.

In an exemplary embodiment of the invention, the location module 302 in the mobile device 300 may be operable to communicate the received three or more location samples to a location server 120. The location server 120 may then perform the selection from among the received three or more location samples and selects the two or more valid location samples based on the associated accuracy indicator. The selected two or more valid location samples may then be communicated to the location module 302 by the location server 120 for determining the location of the mobile device 300.

The location module 302 in the mobile device 300 may be operable to acquire one or more of the location samples for the mobile device 300 utilizing, for example, a GNSS 160. One or more of the location samples may be acquired by the location module 302 utilizing, for example, one or more cell stations 170a-170c. One or more of the location samples may also be acquired by the location module 302 utilizing, for example, a wireless access AP 180 with a known location.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining a location of a mobile device based on a plurality of location samples.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a mobile device, the method comprising:
   acquiring three location samples of said mobile device using three resources, wherein each of said three location samples comprises an associated accuracy indicator;
   determining a respective region around each of said three location samples based on said associated accuracy indicator;
   expanding said respective region around each of said three location samples until a portion of said respective regions two of said three location samples overlap;
   determining valid location samples from among said three location samples as those expanded respective regions that overlap; and
   determining a location of said mobile device utilizing said valid location samples.

2. The method according to claim 1, wherein determining said respective region around each of said three location samples further comprises:
   determining said respective region around each of said three location samples based on a condition of a geographic environment that is associated with one of said three location samples.

3. The method according to claim 1, wherein expanding said respective region around each of said three location samples further comprises:
   expanding said respective region around each of said three location samples proportionally.

4. The method according to claim 1, comprising:
   determining an uncertainty of said location of said mobile device.

5. The method according to claim 1, wherein determining said valid location samples further comprises:
   communicating said three location samples to a location server, wherein said location server selects said valid location samples from among said three location samples; and
   receiving said valid location samples from said location server for determining said location of said mobile device.

6. The method according to claim 1, wherein acquiring the three location samples further comprises:
   using signals broadcast from a global navigation satellite system; and
   triangulating signals received from cell stations.

7. A system comprising:
   one or more processors and/or circuits for use in a mobile device, said one or more processors and/cm circuits being configured to:
      acquire three location samples of said mobile device using three resources, wherein each of said three location samples comprises an associated accuracy indicator;
      determine a respective region around each of said three location samples based on said associated accuracy indicator;
      expanding said respective region around each of said three location samples until a portion of said respective regions for two of said three location samples overlap;
      determine valid location samples from among said three location samples as those expanded respective regions that overlap; and
      determine a location of said mobile device utilizing said valid location samples.

8. The system according to claim 7, wherein said one or more processors and/or circuits are configured to further determine said respective region around each of said three location samples based on a condition of a geographic environment that is associated with one of said three location samples.

9. The system according to claim 7, wherein said one or more processors and/or circuits are configured to expand said respective region around each of said three location samples proportionally.

10. The system according to claim 7, wherein said one or more processors and/or circuits are configured to determine an uncertainty of said location of said mobile device.

11. The system according to claim 7, wherein said one or more processors and/or circuits are configured to:
   communicate said three location samples to a location server, wherein said location server selects said valid location samples from among said three location samples; and
   receive said valid location samples from said location server for determining said location of said mobile device.

12. The system according to claim 7, wherein the three location samples are acquired using signals broadcast from a global navigation satellite system and by triangulating signals received from cell stations.

13. A method for communication in a mobile device, the method comprising:
   acquiring a plurality of location samples of said mobile device using a plurality of resources, wherein each of said plurality of location samples comprises an associated accuracy indicator;
   determining a respective region around each of said plurality of location samples based on said associated accuracy indicator;

expanding said respective region around each of said plurality of location samples until a portion of said respective regions for a majority of said plurality of location samples overlap;

determining valid location samples from among said plurality of location samples as those expanded respective regions that overlap; and determining a location of said mobile device utilizing said valid location samples.

14. The method according to claim 13, wherein determining said region around each of said plurality of location samples further comprises:

determining said respective region around each of said plurality of location samples based on a condition of a geographic environment that is associated with one of said plurality of location samples.

15. The method according to claim 13, wherein expanding said respective region around each of said plurality of location samples further comprises:

expanding said respective region around each of said plurality of location samples proportionally.

16. The method according to claim 13, comprising:
determining an uncertainty of said location of said mobile device.

17. The method according to claim 13, wherein determining said valid location samples further comprises:

communicating said plurality of location samples to a location server, wherein said location server selects said valid location samples from among said plurality of location samples; and receiving said valid location samples from said location server for determining said location of said mobile device.

18. The method according to claim 13, wherein acquiring the plurality of location samples further comprises:

using signals broadcast from a global navigation satellite system; and triangulating signals received from cell stations.

* * * * *

UNITED STATES PATENT AND TRADEMARK OFFICE
CERTIFICATE OF CORRECTION

| | | |
|---|---|---|
| PATENT NO. | : 8,634,846 B2 | Page 1 of 1 |
| APPLICATION NO. | : 12/728957 | |
| DATED | : January 21, 2014 | |
| INVENTOR(S) | : David Garrett | |

It is certified that error appears in the above-identified patent and that said Letters Patent is hereby corrected as shown below:

In the Claims

Column 18, line 15, claim 7, please replace "and/cm circuits" with --and/or circuits--.

Signed and Sealed this
Twenty-ninth Day of April, 2014

Michelle K. Lee
*Deputy Director of the United States Patent and Trademark Office*